United States Patent
El Batawi

(10) Patent No.: US 12,355,122 B2
(45) Date of Patent: Jul. 8, 2025

(54) SOLID OXIDE FUEL CELL HAVING LAMINATED ANODE AND ELECTROLYTE LAYERS AND METHOD OF MAKING THEREOF

(71) Applicant: Bloom Energy Corporation, San Jose, CA (US)

(72) Inventor: Emad El Batawi, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 399 days.

(21) Appl. No.: 17/837,531

(22) Filed: Jun. 10, 2022

(65) Prior Publication Data

US 2022/0399559 A1   Dec. 15, 2022

Related U.S. Application Data

(60) Provisional application No. 63/297,696, filed on Jan. 7, 2022, provisional application No. 63/209,778, filed on Jun. 11, 2021.

(51) Int. Cl.
*H01M 8/1246* (2016.01)
*H01M 4/90* (2006.01)
*H01M 8/12* (2016.01)

(52) U.S. Cl.
CPC ....... *H01M 8/1246* (2013.01); *H01M 4/9025* (2013.01); *H01M 2008/1293* (2013.01)

(58) Field of Classification Search
CPC . H01M 4/8636; H01M 8/1246; H01M 4/9025
See application file for complete search history.

(56) References Cited

U.S. PATENT DOCUMENTS

| | | |
|---|---|---|
| 5,589,285 A | 12/1996 | Cable et al. |
| 6,228,521 B1 | 5/2001 | Kim et al. |
| 6,835,485 B2 | 12/2004 | Ukai et al. |
| 6,972,161 B2 | 12/2005 | Beatty et al. |
| 9,246,184 B1 | 1/2016 | Batawi et al. |
| 10,680,251 B2 | 6/2020 | Gasda et al. |
| 2004/0072054 A1 | 4/2004 | Cochran et al. |
| 2004/0202924 A1 | 10/2004 | Tao et al. |
| 2006/0166070 A1 | 7/2006 | Hickey et al. |
| 2007/0077476 A1 | 4/2007 | Lee et al. |
| 2008/0124602 A1 | 5/2008 | Larsen et al. |
| 2009/0023027 A1 | 1/2009 | Hata |
| 2012/0043010 A1 | 2/2012 | Batawi et al. |
| 2013/0011768 A1 | 1/2013 | Ahn |
| 2017/0271683 A1 | 9/2017 | Pan et al. |
| 2021/0175517 A1 | 6/2021 | Li et al. |

FOREIGN PATENT DOCUMENTS

KR   100886239 B1   2/2009

OTHER PUBLICATIONS

Zongping Shao et al., "Anode-supported thin-film fuel cells operated in a single chamber configuration 2T-I-12", Solid State Ionics 175 (2004) 39-46.

*Primary Examiner* — Sarah A. Slifka
(74) *Attorney, Agent, or Firm* — THE MARBURY LAW GROUP PLLC

(57) ABSTRACT

A solid oxide fuel cell (SOFC) includes a ceramic electrolyte having a thickness of 100 microns or less, an anode laminated to a first side of the electrolyte, and a cathode located on a second side of the electrolyte opposite to the first side.

20 Claims, 3 Drawing Sheets

SOLID OXIDE FUEL CELL HAVING LAMINATED ANODE AND ELECTROLYTE LAYERS AND METHOD OF MAKING THEREOF

PRIORITY

This application is a non-provisional application that claims the benefit of U.S. Provisional Application No. 63/209,778, filed on Jun. 11, 2021, and U.S. Provisional Application No. 63/297,696, filed on Jan. 7, 2022, the contents of each of which are herein incorporated by reference in their entirety.

FIELD

The embodiments of the present invention are generally directed to solid oxide fuel cells (SOFC) and methods of making thereof.

BACKGROUND

In a high temperature fuel cell system, such as a SOFC system, an oxidizing flow is passed through the cathode side of the fuel cell, while a fuel flow is passed through the anode side of the fuel cell. The oxidizing flow is typically air, while the fuel flow can be a hydrocarbon fuel, such as methane, natural gas, propane, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide.

The excess electrons from the negatively charged ion are routed back to the cathode side of the fuel cell through an electrical circuit completed between anode and cathode, resulting in an electrical current flow through the circuit.

SUMMARY

According to various embodiments, a solid oxide fuel cell (SOFC) includes a ceramic electrolyte having a thickness of 100 microns or less, an anode laminated to a first side of the electrolyte, and a cathode located on a second side of the electrolyte opposite to the first side.

According to various embodiments, a method of making a solid oxide fuel cell (SOFC), comprises separately forming a ceramic electrolyte precursor layer and at least one anode precursor layer without contacting each other, stacking the formed at least one anode precursor layer in contact with a first side of the ceramic electrolyte precursor layer, laminating the at least one anode precursor layer and the ceramic electrolyte precursor layer, and forming at least one cathode layer.

DETAILED DESCRIPTION

Figure 1A:
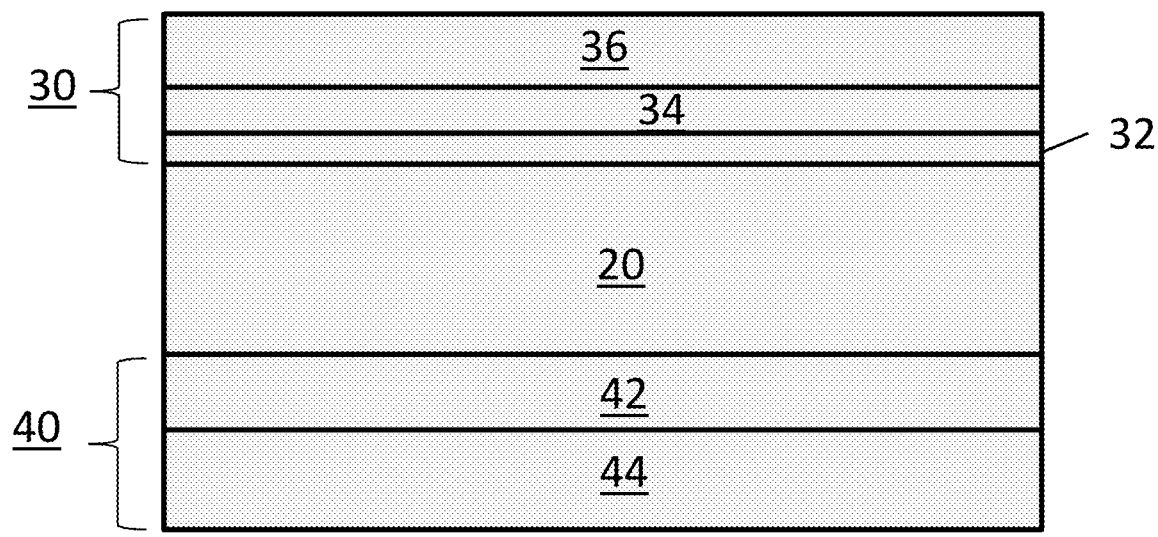
FIGS. 1A and 1B are cross-sectional views of fuel cells according to various embodiments of the present invention.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In the various embodiments, the electrical resistivity of a SOFC may be decreased by reducing the thickness of the ceramic electrolyte. However, a thinner electrolyte is more prone to crack due to defects therein and/or stress imposed thereon. For example, for electrolyte supported cells, firing (i.e., binder burnout and sintering) of a relatively thick anode ink deposited by screen printing or another ink deposition method on a ceramic (i.e., sintered) electrolyte layer causes stress on the ceramic electrolyte. If the electrolyte is relatively thin, then the firing may cause the ceramic electrolyte to crack.

The electrically conductive phase in the anode is thermally cycled between the metal phase (e.g., nickel phase) and a metal oxide phase (e.g., nickel oxide phase) during respective thermal reduction and oxidation steps. For example, the anode may be initially formed with a metal oxide phase and a ceramic phase, followed by a thermal reduction step in a reducing (e.g., hydrogen containing) ambient to convert the metal oxide phase into a metal phase. During the thermal reduction and/or oxidation steps, the volume of the anode changes, which imposes tensile or compressive stress on the electrolyte, which may cause a thinner electrolyte to crack.

In an embodiment of the present invention, the electrolyte precursor layer and one or more anode precursor layers are formed separately without contacting each other. The electrolyte precursor layer and one or more anode precursor layers are then stacked together and laminated into a half-SOFC by any suitable pressing method.

For example, an electrolyte precursor layer and one or more anode precursor layers may be formed separately by tape casting or another suitable ceramic or cermet precursor layer manufacturing process. The one or more anode precursor layers are then dried and placed in contact with each other and with a first side of the dried electrolyte precursor layer, and pressed together, such as by hot isostatic pressing or another suitable pressing method, to form a composite (e.g., a green composite). The composite is then sintered 1300° C. and 1400° C. to form the half-SOFC (i.e., a monolithic substrate for the cathode). The half-SOFC includes a monolithic structure containing one or more cermet anode layers contacting a first side of the ceramic electrolyte layer.

Since the electrolyte is sintered together with the one or more anode layers during the same sintering step, the ceramic (i.e., sintered) electrolyte is not subjected to the stress of anode firing step. This reduces electrolyte cracking or breakage. Therefore, the electrolyte thickness may be decreased to reduce the electrical resistivity of the SOFC without significantly increasing electrolyte damage, such as cracking. For example, the electrolyte may have a thickness of 100 microns or less, such as 5 to 100 microns, for example 5 to 25 microns or 50 to 100 microns.

The porosity in the sintered half-SOFC may be controlled by selecting a desired volume fraction of organic materials (e.g., binder, dispersant, etc.) in the tape, by the control of the ceramic or cermet precursor particle size distribution in the specific tape, and/or by the addition of pore formers, such as fine particles or small spheres of a polymeric material, such as poly(methyl methacrylate) (PMMA), into the tape during the tape casting process. The pore formers are volatized during the hot isostatic pressing or sintering to form pores in the electrolyte layer and/or one or more anode layers.

In an embodiment, one or more cathode layers are then formed on the second side of the ceramic electrolyte layer which is opposite from the first side of the ceramic electrolyte layer. The one or more cathode layers may be formed by an ink deposition method, such as screen printing, followed by firing the one or more cathode layers at a temperature of 950° C. to 1150° C. to form the cathode on the half-SOFC (i.e., the sintered monolithic substrate containing the laminated ceramic electrolyte and cermet anode). As a result, the full SOFC is formed.

In the various embodiments, the one or more cathode layers are formed separately from the electrolyte using tape casting or another suitable method. The one or more cathode layers are then placed in contact with the second surface of the electrolyte precursor layer and pressed together by hot isostatic pressing or another suitable method. The pressing may occur while the electrolyte precursor layer is in contact with or not in contact with the one or more anode precursor layers. The one or more cathode layers are then sintered together with the electrolyte precursor layer and optionally together with the one or more anode precursor layers.

FIG. 1A illustrates an exemplary electrolyte supported fuel cell 10A, according to various embodiments of the present invention.

Referring to FIG. 1, the fuel cell 10A may be a SOFC that contains an electrolyte 20 disposed between a cathode 30 (e.g., first electrode) and an anode 40 (e.g. second electrode).

The electrolyte 20 may have a thickness of less than 110 microns, such as 50 to 100 microns, for example 55 to 75 microns. The electrolyte 20 may comprise an ionically conductive ceramic, such as doped zirconia, doped ceria, and/or any other suitable ionically conductive ceramic oxide material. For example, the electrolyte 20 may include yttria-stabilized zirconia (YSZ), yttria-ceria-stabilized zirconia (YCSZ), scandia-stabilized zirconia (SSZ), ytterbia-ceria-scandia-stabilized zirconia (YCSSZ), or blends thereof. In the YCSSZ, scandia may be present in an amount equal to 9 to 11 mol %, such as 10 mol %, ceria may present in amount greater than 0 and equal to or less than 3 mol %, for example 0.5 mol % to 2.5 mol %, such as 1 mol %, and ytterbia may be present in an amount greater than 0 and equal to or less than 2.5 mol %, for example 0.5 mol % to 2 mol %, such as 1 mol %, as disclosed in U.S. Pat. No. 8,580,456, which is incorporated herein, by reference. In the YCSZ, yttria may be present in an amount equal to 8 to 10 mol %, and optionally ceria may be present in an amount equal to 0 to 3 mol %. In other embodiments, the electrolyte may include samaria, gadolinia, or yttria-doped ceria.

The cathode 30 may include an electrically conductive material, such as an electrically conductive perovskite material or metal. The cathode 30 may comprise one or more layers.

In one embodiment, the cathode 30 may include an optional cathode barrier layer 32 contacting the second side of the electrolyte 20. The cathode barrier layer 32 may comprise a doped ceria, such as samaria, gadolinia and/or praseodymia doped ceria. For example, the cathode barrier layer 32 may comprise 10 to 20 mol % of $Sm_2O_3$, $Gd_2O_3$, and/or $Pr_2O_3$ doped $CeO_2$. The cathode barrier layer 32 may have a thickness of 5 to 10 microns and may have a porosity of 0 to 10%.

The cathode barrier layer 32 allows the use of more reactive overlying cathode layer materials, such as (LaSr)(FeCo)-based perovskites that would otherwise react with the electrolyte 30 to form undesirable zirconates. Furthermore, the cathode barrier layer 32 acts as a diffusion barrier layer reducing or preventing further migration of Co and/or Fe from the overlying cathode layers into the electrolyte 20. The migration of Co and/or Fe into the electrolyte undesirably reduces the ionic conductivity of the electrolyte 20.

The cathode 30 also includes a cathode functional layer 34. The cathode functional layer 34 may be thicker than the cathode barrier layer 32, and may have a thickness of 15 to 50 microns, such as 25 to 30 microns. The cathode functional layer 34 may have a larger porosity than the cathode barrier layer 32 and may include an electrically conductive material, such as an electrically conductive perovskite, such as lanthanum strontium manganite (LSM), lanthanum strontium cobaltite $(La,Sr)CoO_3$ ("LSCo"), lanthanum strontium cobalt ferrite $(La,Sr)(Co,Fe)O_3$ (LSCF), lanthanum strontium ferrite (LSF), lanthanum calcium manganite (LCM), lanthanum strontium manganese ferrite (LSMF), lanthanum strontium chromite (LSCr), etc., or a metal, such as Pt.

In one embodiment, the cathode functional layer 34 may include an electrically conductive component and an ionically conductive component, as described in U.S. Pat. No. 10,249,883, issued on Apr. 2, 2019, incorporated herein by reference in its entirety. The ionically conductive component comprises a ceria-based ceramic component, such as at least one of samaria doped ceria (SDC), gadolinia doped ceria (GDC), or yttria doped ceria (YDC). For example, the ceria-based ceramic component has a formula $Ce_{(1-x)}A_xO_2$, wherein A comprises at least one of samarium (Sm), gadolinium (Gd), or yttria (Y), wherein x is in a range of around 0.1 to 0.4. The electrically conductive component comprises an electrically conductive ceramic, such as lanthanum strontium manganite (LSM), lanthanum calcium manganite (LCM), lanthanum strontium cobalt ferrite (LSCF), lanthanum strontium ferrite (LSF), lanthanum strontium manganese ferrite (LSMF) and lanthanum strontium chromite (LSCr), or lanthanum strontium cobaltite (LSCo). The cathode functional layer 34 may contain 10 to 90 wt %, such as 55-75 wt %, of the ceria-based ceramic component and 10 to 90 wt %, such as 25-45 wt % of the electrically conductive component.

The cathode 30 also includes an optional cathode contact layer 36. The cathode contact layer 36 may be thicker and more electrically conductive than the cathode functional layer 34. The cathode contact layer 36 may have a thickness of 40 to 100 microns, such as 50 to 60 microns. The cathode functional layer 34 may include an electrically conductive material, such as an electrically conductive perovskite, such as lanthanum strontium manganite (LSM), lanthanum strontium cobaltite $(La,Sr)CoO_3$ ("LSCo"), lanthanum strontium cobalt ferrite $(La,Sr)(Co,Fe)O_3$ (LSCF), lanthanum strontium ferrite (LSF), lanthanum calcium manganite (LCM), lanthanum strontium manganese ferrite (LSMF), lanthanum strontium chromite (LSCr), etc., or a metal, such as Pt.

The anode 40 may comprise one or more layers that include at least one cermet that includes a metallic phase and a ceramic phase. The metallic phase may include a metal catalyst and the ceramic phase may include one or more ceramic materials. The metallic phase may be very finely dispersed within the ceramic matrix of the ceramic phase, so as to limit damage that may occur if the metallic phase is oxidized. For example, the metallic phase may have an average grain size less than 500 nanometers, such as from 100 to 400 nanometers.

The ceramic phase of the anode 40 may comprise any suitable ionically conductive ceramic material, such as a doped ceria and/or a doped zirconia. For example, the ceramic phase may include, but is not limited to gadolinia-doped ceria (GDC), samaria-doped ceria (SDC), praseodymia doped ceria (PDC), ytterbia-doped ceria (YDC), scandia-stabilized zirconia (SSZ), ytterbia-ceria-scandia-stabilized zirconia (YCSSZ), yttria stabilized zirconia (YSZ), or the like. For example, the ceramic material may comprise a doped ceria, such as samaria, gadolinia and/or praseodymia doped ceria, for example 10 to 20 mol % of $Sm_2O_3$, $Gd_2O_3$, and/or $Pr_2O_3$ doped $CeO_2$.

The metallic phase may include a metal catalyst such as nickel (Ni), which operates as an electron conductor. The metal catalyst may be in a metallic state or may be in an oxide state. For example, the metal catalyst forms a metal oxide when it is in an oxidized state. Thus, the anode 40 may be annealed in a reducing atmosphere prior to and/or during operation of the fuel cell 10A, to reduce the metal catalyst to a metallic state.

According one embodiment, the metallic phase in its oxide state may include the metal catalyst and a dopant (i.e., alloying element). For example, the metallic phase may be represented by formula $D_xNi_{1-x}O$, where D is a dopant (in any oxidation state) selected from Al, Ca, Ce, Cr, Fe, Mg, Mn, Nb, Pr, Ti, V, W, or Zr, any oxide thereof, or any combination thereof, as described in U.S. Pat. No. 10,680,251, issued on Jun. 9, 2020, and incorporated herein by reference in its entirety. X may range from 0 to 1, such as 0.01 to 0.1, and y may range from 1 to 2. In other embodiments, x may range from 0.01 to 0.04. For example, x may be 0.02 and y may be either 1 or 2.

Accordingly, the metallic phase may comprise from 1 to 10 atomic percent ("at %") of the metal oxide dopant and 99 to 90 at % of the metal catalyst. For example, the metallic phase may comprise from 2 to 4 at % of the metal oxide dopant and 98 to 96 at % of the metal catalyst, as manufactured before being reduced.

According to various embodiments, the anode 40 may include a metallic phase that includes NiO doped with MgO. For example, the metallic phase may include $Mg_xNi_{1-x}O$, wherein x is within the ranges described above. After anode manufacture and before or during fuel cell operation, the metallic phase is reduced by being exposed to a reducing ambient (e.g., fuel) at an elevated temperature (e.g., at a temperature ranging from 750-950° C.). The reduced metallic phase may be represented by the formula $D_xM_{1-x}$.

The anode 40 may be an oxidation-tolerant electrode having a functionally graded configuration. For example, as shown in FIG. 1A, the anode 40 may include a first layer 42 disposed on or over the first side of the electrolyte 20, and a second layer 44 disposed on the first layer 42. The first layer 42 may be disposed closer to the electrolyte 20 than the second layer 44. The first layer 42 may be configured to electrochemically oxidize a fuel. The second layer 44 may be configured for electron conduction and may operate as a reforming catalyst.

The first layer 42 may be thinner than the second layer 44. For example, the first layer 42 may have a thickness of 5 to 40 microns, such as 15 to 20 microns, while the second layer 44 may have a thickness of 20 to 60 microns, such as 30 to 40 microns. The first layer 42 may have the same or different porosity from the second layer 44. For example, the porosity of both layers ranges from 5 to 20%.

The first and second layers 42, 44 may each include a cermet including a metallic phase and a ceramic phase, as described above. The metallic phases and/or the ceramic phases of the first and second layers 42, 44 may include the same or different materials. In some embodiments, one of both of the first and second layers 42, 44 may include only a single phase. For example, the second layer 44 may include a metallic phase and the ceramic phase may be omitted.

In some embodiments, the first layer 42 may include, by weight percent, more of the ceramic phase and less of the metallic phase than the second layer 44. A weight percent ratio of the ceramic phase to the metallic phase included in the first layer 42 may range from 99:1 to 50:50. For example, the first layer 42 may include from 80 to 95 wt % of the ceramic phase, and from 1 to 30 wt %, such as from 5 to 20 wt % of the metallic phase, based on the total weight of the first layer 42.

A weight percent ratio of the ceramic phase to the metallic phase in the second layer 44 may range from 0:100 to 50:50. For example, the second layer 44 may include from 15 to 40 wt %, such as 20 to 35 wt % of the ceramic phase, and from 60 to 85 wt %, such as 65 to 80 wt % of the metallic phase, based on the total weight of the second layer 44. The dopant may be located in at least one of the first layer 42 and second layer 44, such as only in the first layer 42, only in the second layer 44 or in both first and second layers 42, 44.

In one embodiment, the method of forming the SOFC 10A comprises separately forming the ceramic electrolyte precursor layer, a first anode precursor layer, and a second anode precursor layer by tape casting, followed by stacking the first and second tape cast anode precursor layers in contact with a first side of the tape cast ceramic electrolyte precursor layer, and then hot isostatic pressing the first and second tape cast anode precursor layers in contact with a first side of the tape cast ceramic electrolyte precursor layer to form a green composite. The method further comprises sintering the green composite to form a half-SOFC comprising a ceramic electrolyte 20 and first and second cermet anode layers 42, 44, and forming the at least one cathode layer 30 on a second side of the ceramic electrolyte 20 opposite to the first side after the step of sintering.

Figure 1B:
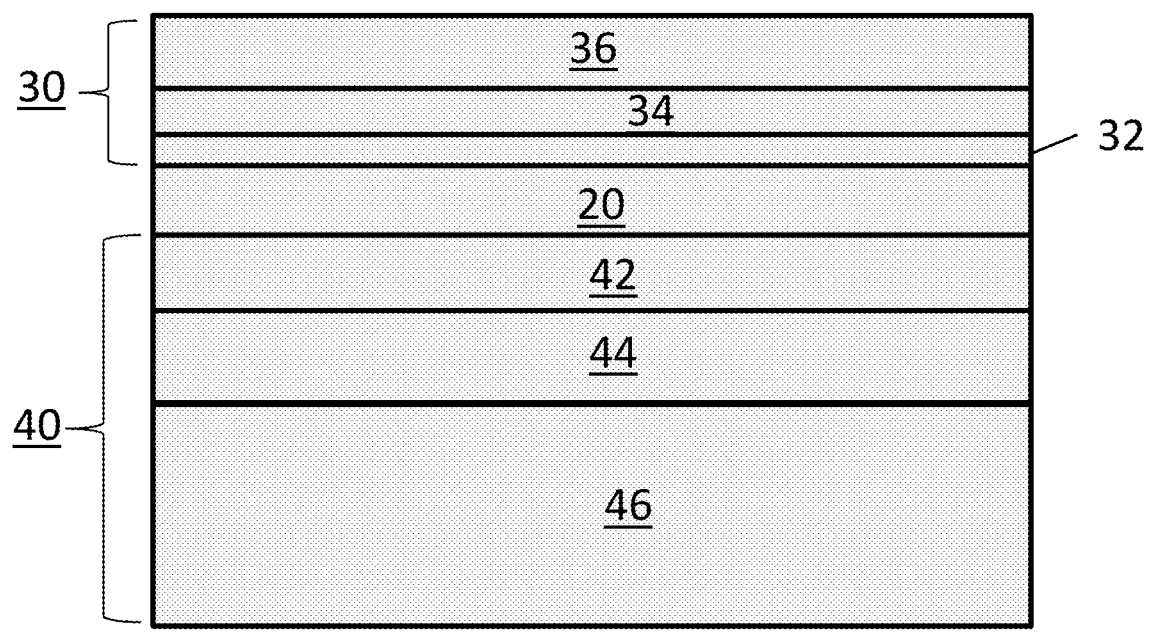

FIG. 1B illustrates an anode supported SOFC 10B according to another embodiment of the present invention.

The anode supported SOFC 10B differs from the electrolyte supported SOFC 10A by the presence of an additional anode support layer 46 and by the reduced thickness of the electrolyte 20. The remaining layers of the anode supported SOFC 10B may be the same as those of the electrolyte supported SOFC 10A and will not be described again.

In the anode supported SOFC 10B, the electrolyte 20 thickness may be 50 microns or less, such as 5 to 50 microns, for example 5 to 25 microns. The electrolyte 20 is thinner than the anode 40.

The anode support layer 46 may be thicker than the thickness of the combination of the first and second layers 42, 44 of the anode 40. The anode support layer 46 thickness may be 50 to 200 microns. The anode support layer may comprise a cermet material which include from 20 to 45 wt %, such as 25 to 35 wt % of the ceramic phase, and from 55 to 80 wt %, such as 65 to 75 wt % of the metallic phase. The ceramic phase and the metallic phase composition of the anode support layer 46 may be the same as those of the first and second layers 42, 44 of the anode 40. Alternatively, the ceramic phase of the anode support layer 46 may comprise 8 to 10 mol percent yttria stabilized zirconia or 8 to 10 mol percent yttria and 0.1 to 3 mol percent ceria stabilized zirconia. In one embodiment, the average ceramic phase particle size in the anode support layer 46 may be 0.5 to 2 microns, while the average metallic phase particle size in the anode support layer 46 may be 2 to 10 microns (i.e. larger than the average particle size of the ceramic phase.

In one embodiment, the method of forming the SOFC 10B includes tape casting an anode support precursor layer and laminating the anode support precursor layer to the second anode precursor layer followed by the above described sintering to form a cermet anode support layer 46. Additionally, or alternatively, laminate tapes of different compositions and thicknesses may be used to make the anode, electrolyte, and/or barrier layers.

Figure 2:
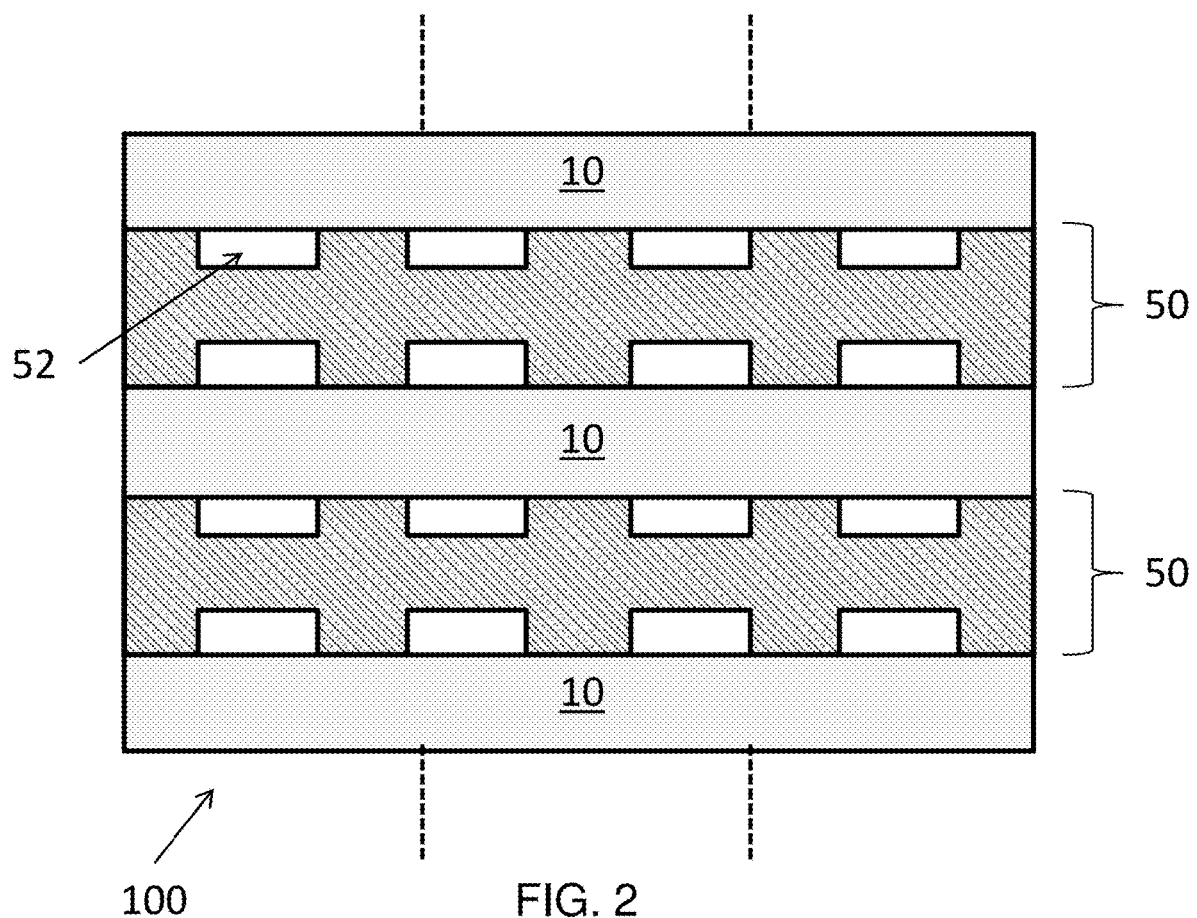
FIG. 2 is a cross-sectional view of a fuel cell stack according to various embodiments of the present invention.

FIG. 2 illustrates a plan view of a fuel cell stack 100 according to various embodiments of the present invention.

The term "fuel cell stack," as used herein, means a plurality of stacked fuel cells that can optionally share a common fuel inlet and exhaust passages or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity. For example, the stacks may share the same end plates. In this case, the stacks jointly comprise a distinct electrical entity, such as a column. In this case, the electrical power output from both stacks cannot be separately controlled.

Referring to FIG. 2, the stack 100 includes fuel cells 10 (e.g., SOFCs 10A of FIG. 1A or SOFCs 10B of FIG. 1B) stacked on one another and separated by interconnects 50. The interconnects 50 include flow channels 52 configured to provide fuel or air to the fuel cells 10. The interconnects 50 may also operate to electrically connect the fuel cells 10 in series.

Figure 3:
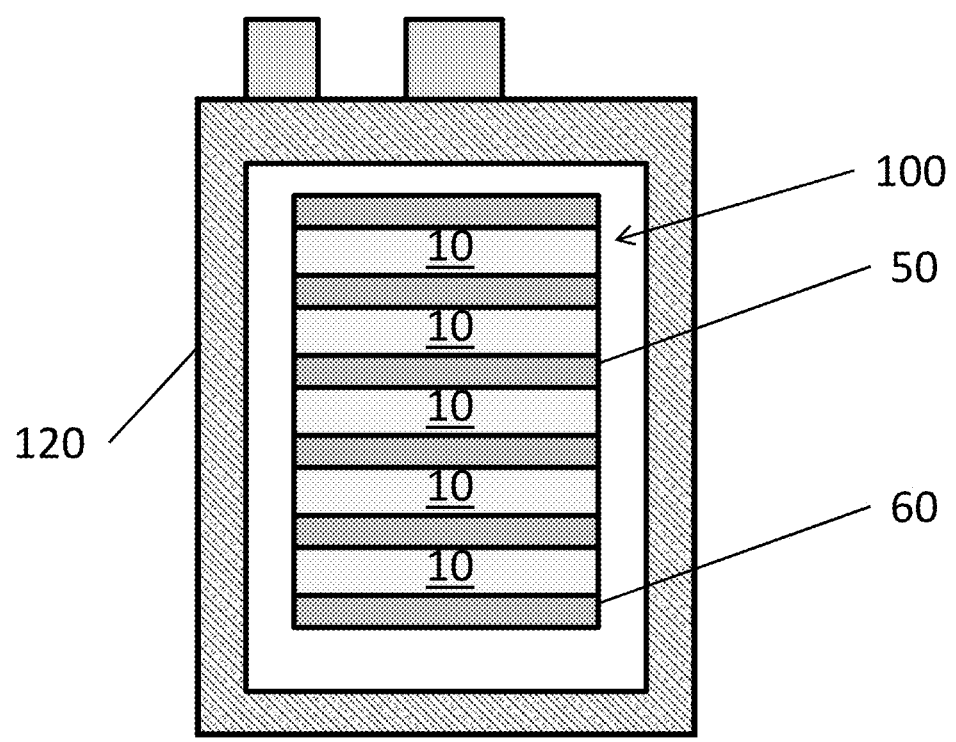
FIG. 3 is a cross-sectional view of a hotbox of a fuel cell system, according to various embodiments of the present invention.

FIG. 3 illustrates a plan view of a fuel cell system hotbox 120 including the stack 100 of FIG. 2, according to various embodiments of the present invention.

Referring to FIG. 3, the hotbox 120 is shown to include the fuel cell stack 100. However, the hotbox 120 may include two or more of the stacks 100. The stack 100 may include the electrically connected fuel cells 10 (e.g., 10A or 10B) stacked on one another, with the interconnects 50 disposed between the fuel cells 10, and end plates 60. The hotbox 120 may include other components, such as fuel conduits, air conduits, seals, electrical contacts, etc, and may be incorporated into a fuel cell system including balance of plant components. The interconnects 50 and/or end plates 60 may comprise any suitable gas impermeable and electrically conductive material, such as a chromium-iron alloy, such as an alloy containing 4 to 6 wt % iron and balance chromium. The interconnects 50 electrically connect adjacent fuel cells 10 and provide channels for fuel and air to reach the fuel cells 10.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It will also be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. In some embodiments, a value of "X" may include values of +/−1% X. It will be further understood that the endpoints of each of the ranges are significant both in relation to the other endpoint, and independently of the other endpoint.

What is claimed is:

1. A solid oxide fuel cell (SOFC), comprising:
   a ceramic electrolyte having a thickness of 100 microns or less;
   an anode laminated to a first side of the electrolyte, the anode comprising a cermet comprising a metallic phase that comprises a dopant comprising MgO; and
   a cathode located on a second side of the electrolyte opposite to the first side.

2. The SOFC of claim 1, wherein the cathode is deposited by an ink deposition method on the second side of the electrolyte.

3. The SOFC of claim 1, wherein the anode comprises:
   a first layer laminated to the electrolyte and comprising the cermet comprising a ceramic phase and a metallic phase comprising a metal catalyst; and
   a second layer laminated to the first layer and comprising the cermet comprising the ceramic phase and the metallic phase comprising a metal catalyst,
   wherein the first layer is disposed between the second layer and the electrolyte, and the second layer contains a higher ratio of the metallic phase to the ceramic phase than the first layer.

4. The SOFC of claim 3, wherein the metallic phase of the second layer comprises:
   from about 2 to about 4 at % of the dopant; and
   from about 98 to about 96 at % of the metal catalyst;
   the metal catalyst of the second layer comprises NiO; and
   the metallic phase of the second layer comprises $Mg_xNi_{1-x}O$ or $Mg_xNi_{1-x}$, wherein x ranges from about 0.01 to about 0.04.

5. The SOFC of claim 3, wherein:
   the first layer comprises from about 80 to about 95 wt % of the ceramic phase, and from about 5 to about 20 wt % of the metallic phase, based on the total weight of the first layer; and
   the second layer comprises from about 20 to about 35 wt % of a ceramic phase, and from about 65 to about 95 wt % of the metallic phase, based on the total weight of the second layer.

6. The SOFC of claim 3, wherein the electrolyte thickness is 50 to 100 microns, and the SOFC comprises an electrolyte supported SOFC.

7. The SOFC of claim 3, further comprising an anode support layer which is thicker than a sum of thicknesses of the first and the second layers of the anode.

8. The SOFC of claim 7, wherein:
the anode support layer comprises a cermet having metallic phase particles having a larger average size then ceramic phase particles;
the electrolyte thickness is 5 to 25 microns; and
the SOFC comprises an electrolyte supported SOFC.

9. The SOFC of claim 1, wherein:
the cathode comprises a cathode barrier layer located between the second side of the electrolyte and a cathode functional layer; and
the cathode barrier layer comprises samaria, gadolinia or praseodymia doped ceria; and
the cathode functional layer comprises an electrically conductive component and an ionically conductive component.

10. A method of making a solid oxide fuel cell (SOFC), comprising:
separately forming a ceramic electrolyte precursor layer and at least one anode precursor layer without contacting each other;
stacking the formed at least one anode precursor layer in contact with a first side of the ceramic electrolyte precursor layer;
laminating the least one anode precursor layer and the ceramic electrolyte precursor layer;
forming at least one cathode layer; and
sintering the ceramic electrolyte precursor layer and at least one anode precursor layer to form a ceramic electrolyte and an anode,
wherein the ceramic electrolyte has a thickness of 100 microns or less,
wherein the anode is laminated to a first side of the ceramic electrolyte, the anode comprising a cermet comprising a metallic phase that comprises a dopant comprising MgO, and
wherein the cathode is located on a second side of the electrolyte opposite to the first side.

11. The method of claim 10, wherein:
the step of separately forming the ceramic electrolyte precursor layer and the at least one anode precursor layer comprises separately forming the ceramic electrolyte precursor layer and the at least one anode precursor layer by tape casting;
the step of stacking comprises stacking the at least one tape cast anode precursor layer in contact with a first side of the tape cast ceramic electrolyte precursor layer; and
the step of laminating comprises hot isostatic pressing the at least one tape cast anode precursor layer in contact with the first side of the tape cast ceramic electrolyte precursor layer to form a green composite.

12. The method of claim 11, wherein the step of sintering comprises sintering the green composite to form a half-SOFC comprising the ceramic electrolyte and at least one cermet anode layer, and forming the at least one cathode layer on the second side of the ceramic electrolyte opposite to the first side after the step of sintering.

13. The method of claim 12, wherein the step of forming the at least one cathode layer comprises screen printing the at least one cathode layer.

14. The method of claim 12, wherein:
the at least one cathode layer comprises a cathode barrier layer located between the second side of the ceramic electrolyte and a cathode functional layer; and
the cathode barrier layer comprises samaria, gadolinia or praseodymia doped ceria; and
the cathode functional layer comprises an electrically conductive component and an ionically conductive component.

15. The method of claim 10, wherein:
the step of separately forming the ceramic electrolyte precursor layer and the at least one anode precursor layer comprises separately forming the ceramic electrolyte precursor layer, a first anode precursor layer, and a second anode precursor layer by tape casting;
the step of stacking comprises stacking the first and second tape cast anode precursor layers in contact with a first side of the tape cast ceramic electrolyte precursor layer;
the step of laminating comprises hot isostatic pressing the first and second tape cast anode precursor layers in contact with the first side of the tape cast ceramic electrolyte precursor layer to form a green composite;
the step of sintering comprises sintering the green composite to form a half-SOFC comprising the ceramic electrolyte and first and second cermet anode layer; and
the step of forming the at least one cathode layer on the second side of the ceramic electrolyte opposite to the first side is performed after the step of sintering.

16. The method of claim 15, wherein the first cermet anode layer is disposed between the second anode cermet layer and the ceramic electrolyte, and the second anode cermet layer contains a higher ratio of the metallic phase to the ceramic phase than the first anode cermet layer.

17. The method of claim 15, further comprising tape casting an anode support precursor layer and laminating the anode support precursor layer to the second anode precursor layer followed by the sintering to form a cermet anode support layer.

18. The method of claim 17, wherein:
the cermet anode support layer has metallic phase particles having a larger average size then ceramic phase particles;
the ceramic electrolyte thickness is 5 to 25 microns; and
the SOFC comprises an electrolyte supported SOFC.

19. The method of claim 10, wherein the electrolyte thickness is 50 to 100 microns, and the SOFC comprises an electrolyte supported SOFC.

20. A solid oxide fuel cell (SOFC), comprising:
a ceramic electrolyte having a thickness of 100 microns or less;
an anode laminated to a first side of the electrolyte; and
a cathode located on a second side of the electrolyte opposite to the first side,
wherein the anode comprises:
a first layer laminated to the electrolyte and comprising a cermet comprising a ceramic phase and a metallic phase comprising a metal catalyst; and
a second layer laminated to the first layer and comprising the ceramic phase and the metallic phase comprising the metal catalyst,
wherein the first layer is disposed between the second layer and the electrolyte, and the second layer contains a higher ratio of the metallic phase to the ceramic phase than the first layer,
wherein the metallic phase of the second layer comprises:
from about 2 to about 4 at % of a dopant; and
from about 98 to about 96 at % of the metal catalyst;

the dopant of the second layer comprises MgO;
the metal catalyst of the second layer comprises NiO; and
the metallic phase of the second layer comprises $Mg_xNi_{1-x}O$ or $Mg_xNi_{1-x}$, wherein x ranges from about 0.01 to about 0.04.

* * * * *

UNITED STATES PATENT AND TRADEMARK OFFICE
CERTIFICATE OF CORRECTION

| | |
|---|---|
| PATENT NO. | : 12,355,122 B2 |
| APPLICATION NO. | : 17/837531 |
| DATED | : July 8, 2025 |
| INVENTOR(S) | : Emad El Batawi |

Page 1 of 1

It is certified that error appears in the above-identified patent and that said Letters Patent is hereby corrected as shown below:

In the Claims

In Column 8, Claim 1, Line 34, cancel "MgQ" and insert --MgO--.

Signed and Sealed this
Twelfth Day of August, 2025

Coke Morgan Stewart
*Acting Director of the United States Patent and Trademark Office*